Aug. 18, 1970     K. H. SPENCER     3,524,736

GRINDING SEGMENT AND HOLDER THEREFOR

Filed Oct. 10, 1968

*INVENTOR*
KENDALL H. SPENCER

BY    *Stephen M. Mihaly*

ATTORNEY

United States Patent Office 3,524,736
Patented Aug. 18, 1970

3,524,736
GRINDING SEGMENT AND HOLDER THEREFOR
Kendall H. Spencer, Winchester, Mass., assignor to Pneumo Dynamics Corporation, Cleveland, Ohio, a corporation of Delaware
Filed Oct. 10, 1968, Ser. No. 766,497
Int. Cl. B24d 7/06
U.S. Cl. 51—209
12 Claims

ABSTRACT OF THE DISCLOSURE

A grinding segment having notched means in the front face thereof is adjustably mounted in a chuck by releasable clamps. In the unworn condition, the grinding segment is precluded from movement from a work piece by the chuck. A clamp projection is accommodated by the notched means of the grinding segment when the segment is unworn. When the grinding segment becomes worn, the clamps are released, the grinding segments are advanced and the clamps are then secured to the chuck with the clamp projection in engagement with the upper part of the grinding segment to preclude movement of the segment away from the work.

BACKGROUND OF THE INVENTION

This invention relates to abrasive segments for grinding wheels and the like and particularly to a grinding segment and holder therefor enabling the advancement of the grinding segment toward the work piece after the grinding segment is worn.

Exemplary disclosures of this general type are shown in U.S. Pats. 1,369,965; 1,677,866; 1,795,354; 1,797,526; 1,892,434; 2,051,618; 2,126,403; 2,541,844; 2,795,903; and Great Britain 190,028.

The devices described in the exemplary patents noted above would appear suitable for the intended purpose of providing an axially adjustable grinding segment in order to accommodate for wear. In fact none of these devices have achieved any commercial acceptance. The axial adjustment of grinding segments is now conventionally accomplished by the insertion of wooden blocks between the chuck and the grinding segment as the segment wears during use. Obviously this produces an unsatisfactory amount of down time.

One reason for the lack of acceptance of the prior art devices is the inordinate complexity of the chuck, as in Pats. 1,797,526; 2,541,844 and 2,795,903, or the inordinate complexity of the chuck along with the inordinate amount of modification of the grinding segment as in 1,369,968; 1,677,866; 1,892,434 and 2,051,618. It will be readily apparent that the complexity of the chuck and/or the grinding segment would produce an unnecessarily expensive device.

The complexity of the prior art devices is overcome in the practice of this invention by providing a grinding segment having notches in the front face thereof coupled with a removable clamp which comprises a lug which may be positioned against the top face of the grinding segment to hold the same in an axially advanced position.

SUMMARY OF THE INVENTION

The grinding segment of this invention comprises elongate notches intermediate the front face extending lengthwise from adjacent each side toward the other side less than the width of the front face to provide a recess for a removable chuck clamp. The chuck clamp extends between adjacent spaced apart grinding segments and is secured to the chuck intermediate the ends of the clamp. In an unworn condition, the chuck precludes axial displacement of the grinding segments away from a work piece caused by contact therewith. When the grinding segment becomes worn, the same chuck clamps are positioned against the top surface of the segment to preclude axial displacement of the grinding segments caused by contacting a work piece.

It is an object of this invention to provide a grinding segment which is readily axially adjustable from a first position wherein the segments abuts a chuck to a second position wherein the grinding segment is held adjacent one end thereof by a chuck clamp.

Another object of the invention is to provide a combination chuck, grinding segment and chuck clamp assembly wherein the grinding segments may be axially adjusted with minimum effort and down time.

Another object of the invention is to provide a grinding segment and chuck clamp therefor which may be attached to a chuck to provide axially adjustable grinding segments.

DESCRIPTION OF THE PREFERRED EMBODIMENT

Figure 1:
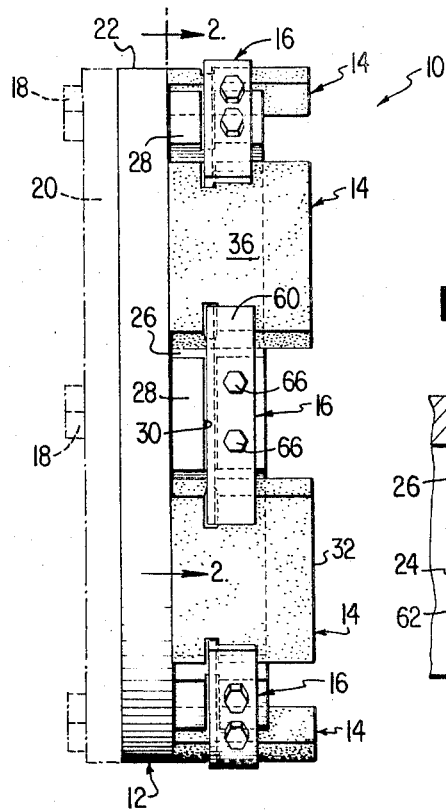
FIG. 1 is an elevational view of a combination chuck, grinding segment and chuck clamp assembly.

Attention is directed to FIG. 1 wherein there is shown a grinding assembly 10 comprising as major components a chuck 12, a plurality of circumferentially spaced apart grinding segments 14 made of abrasive material and a like number chuck clamps 16. The chuck 12 is secured by suitable fasteners 18 to a rotatable driving head 20 of any suitable grinding machine.

Figure 2:
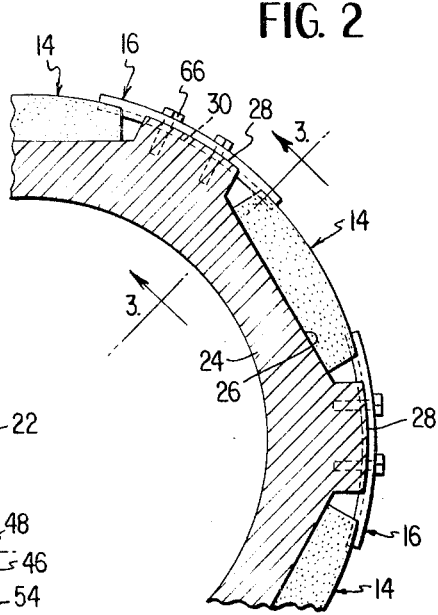
FIG. 2 is an enlarged cross sectional view of the assembly of FIG. 1 taken substantially along line 2—2 thereof as viewed in the direction indicated by the arrows.
Figure 4:
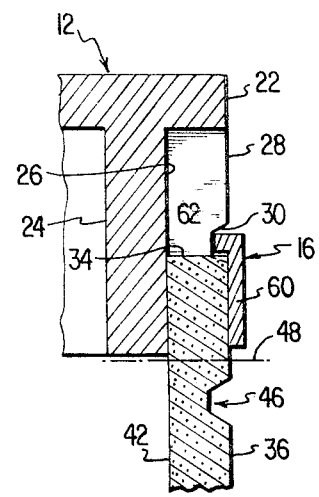
FIG. 4 is a view similar to FIG. 3 illustrating the grinding segment in a second axially advanced position when the grinding segment is substantially worn.

The chuck 12 comprises a flange 22 and an annular retaining ring 24 extending perpendicularly therefrom. A plurality of slots or segment receiving means 26 are machined or otherwise formed in the ring 24 and define therebetween a plurality of shoulders or ribs 28. As seen in FIGS. 1, 2 and 4, the ribs 28 comprise a circumferentially extending slot or groove 30 in which the clamps 16 are positioned as will be explained hereinafter.

Figure 3:
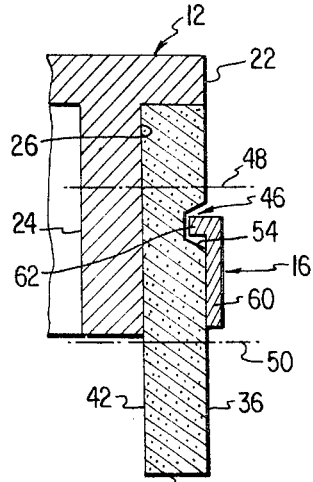
FIG. 3 is an enlarged cross sectional view of the assembly taken substantially along line 3—3 of FIG. 2 as viewed in the direction indicated by the arrows and illustrating the grinding segment in a first position when the grinding segment is substantially unworn.
Figure 5:
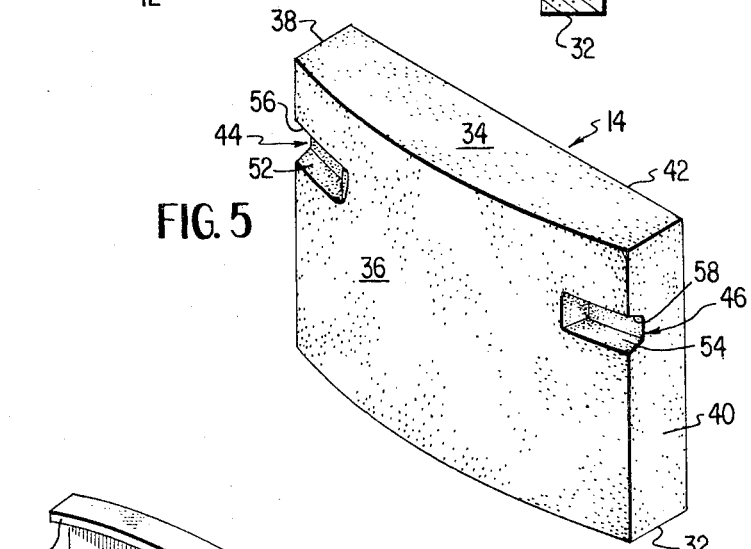
FIG. 5 is an isometric view of the grinding segment of the invention.

The unworn grinding segment 14 is shown in FIGS. 1, 3 and 5 and comprises a planar bottom grinding face 32, a planar non-grinding top face 34 parallel to the grinding face 32 and a front face 36. The front face 36 is perpendicular to the top and bottom faces 32, 34 and describes a segment of a cylinder the axis of which is parallel to the sides 38, 40. The sides 38, 40 need not be perpendicular to the back face 42 as shown and may conveniently be described as axially parallel. Preferably the sides 38, 40 are greater than minimal thickness. The back face 42 is conveniently planar in order to be fully supported by the planar bottom of the slot 26.

An important feature of the invention comprises elongate notches or notch means 44, 46 intermediate the front face 36 extending lengthwise from each side 38, 40 respectively toward the other side 40, 38 less than the width of the front face 36. A convenient manner for locating the notches 44, 46 along the axial dimension of the grinding segment 14 is best described with reference to FIGS. 3 and 4. As shown in FIG. 4, that portion of the grinding segment 14 above the bottom of the chuck 12 or above a suitable reference line 48 is denominated a top or upper portion of the grinding segment 14 which is used to secure the segment 14 in the slot 26 and is not used to abradingly contact a work piece. With reference to FIG. 3, that portion of the grinding segment 14 below the bottom of the chuck 12 or below a suitable reference line 50 is denominated a bottom portion of the grinding segment 14 which is used for abradingly contacting the work and is not used in any manner to secure the segment 14 in the slot 26. That portion of the grinding segment 14 between the reference lines 48, 50 is denominated a central portion.

The notches 44, 46 preferably reside substantially wholly in the center portion of the grinding segment 14 in order to cooperate with the clamps 16 and to minimize special preparation of the grinding segment 14. The notches 44, 46 are coplanar so that a single clamp 16 may be used to secure adjacent sides of the adjacent grinding segments 14 as shown best in FIG. 1.

Each of the notches 44, 46 provide an upwardly facing shoulder 52, 54 and a downwardly facing shoulder 56, 58. The notches 44, 46 extend less than halfway across the front face 36 in order to minimize the effort involved in producing the grinding segment 14, to preserve insofar as possible the transverse cross section of the segment 14 for strength purposes and to maintain the transverse cross section for grinding purposes as may be visualized when the segment 14 is worn to a greater extent than that shown in FIG. 4. It is apparent that the notches 44, 46 are of sufficient width to accommodate the clamps 16 without engagement thereof as will be explained hereinafter.

Figure 6:
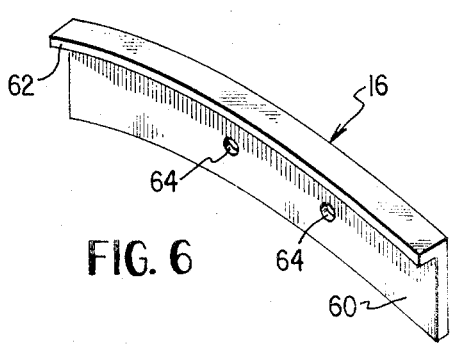
FIG. 6 is an isometric view of the chuck clamp of this invention.

The chuck clamp 16 is shown best in FIG. 6 and comprises a rigid arcuate band or strap element 60 of greater length than the spacing between the grinding segments 14 as may be seen in FIG. 1. Along the length of the strap 60 is a lug or protrusion 62 which resides in the slots 46, 44 of adjacent grinding segments 14 and also in the slot 30 provided in the rib 28. Suitable apertures 64 are provided in the strap element 60 to receive releasable fasteners 66, such as machine screws, to secure the clamp 16 to the chuck 12 as shown in FIG. 1.

Referring to FIG. 3, it will be seen that the grinding segment 14 is precluded from axial movement away from a work piece by the flange 22 of the chuck 12. The notches 44, 46 provide sufficient clearance for the clamp lugs 62 so that the segment 14 is maintained against axial movement away from the work substantially only by the flange 22. This feature presents an advantage in the manufacture of the grinding segments 14 since the notches 44, 46 do not have to be located on the front face 36 with great accuracy. It will be apparent that the notches 44, 46 may be sufficiently wide to avoid contact with the clamp lug 62 throughout the limits of manufacturing tolerances relating to the location of the notches 44, 46.

It will be apparent that axial movement of the grinding segment 14 toward the work is precluded by frictional contact between the segment 14 and the chuck clamps 16. It will also be seen that the chuck clamp 16 precludes radial displacement of the grinding segments 14.

In the alternative, the notches 44, 46 may engage the lug 62 to facilitate in holding the segment 14 against axial movement away from a work piece.

Referring to FIG. 4, it will be seen that the lug 62 engages the top surface 34 of the grinding segment 14 to preclude axial movement thereof away from the work when the grinding segment 14 is substantially worn. Axial movement of the grinding segment 14 toward the work is again precluded by frictional contact between the segment 14 and the chuck clamp 16. It will again be seen that the chuck clamp 16 precludes radial displacement of the grinding segment 14.

Accordingly, the chuck clamp 16 prevents axial movement of the grinding segment 14 away from a work piece when the segment 14 is substantially worn, precludes axial movement of the grinding segment 14 toward the work piece in any condition of wear of the segment 14 and maintains the grinding segment 14 against radial displacement in any condition of wear of the segment 14.

Although only one embodiment of the invention has been shown, it will be apparent to those skilled in the art having the teachings herein that other embodiments are practicable. Accordingly, the scope of the invention is as set forth in the claims.

What is claimed is:

1. An axially adjustable grinding segment of the type made of abrasive material having straight axially parallel sides, a planar bottom grinding face perpendicular to the sides and a front face defining a portion of a cylinder the axis of which is parallel to the sides, the improvement wherein the front face provides
    elongate notches intermediate the front face extending lengthwise from each side toward the other side less than the width of the front face for nonengageably receiving releasably secured chuck clamps when the grinding segment is substantially unworn, the width of the notches being a minor portion of the length of the front face.

2. The structure of claim 1 wherein the grinding segment comprises a top planar non-grinding face parallel to the bottom face providing an upwardly facing shoulder for engagement with releasably secured chuck clamps for holding the grinding segment against axial movement away from a work piece in a second grinding position when the grinding segment is substantially worn.

3. The structure of claim 1 wherein the notches are coplanar and reside in a plane parallel to the bottom face.

4. An axially adjustable grinding segment of the type made of abrasive material having straight axially parallel sides, a planar bottom grinding face perpendicular to the sides, a top face providing an upwardly facing shoulder for engagement with releasably secured chuck clamps for holding the grinding segment against axial movement away from a work piece when the grinding segment is substantially worn, and a front face defining a portion of a cylinder the axis of which is parallel to the sides, the improvement wherein the front face comprises
    elongate notches intermediate the front face extending lengthwise from adjacent each side toward the other side less than the width of the front face for nonengageably receiving the chuck clamps when the grinding segment is substantially unworn, the width of the notches being a minor portion of the length of the front face.

5. The structure of claim 4 wherein the notches are coplanar and reside in a plane parallel to the bottom face.

6. The grinding assembly comprising
    a chuck having circumferentially spaced apart grinding segment receiving means;
    grinding segments in the receiving means comprising sides, a planar bottom grinding face, a top face defining an upwardly facing shoulder abutting the chuck, and a front face having notch means intermediate the ends thereof; and
    a clamp comprising
        a rigid element overlying an unnotched portion of the grinding segment for precluding outward movement thereof and having an integral lug disposed in the notch means out of engagement therewith and having an extending portion juxtaposed to the chuck; and
    means releasably securing the extending portion to the chuck whereby the grinding segment may be advanced to a position wherein the lug engages the top face shoulder.

7. The combination of claim 6 wherein the notch means of adjacent grinding segments reside in common planes and the lugs reside in the coplanar notches.

8. The combination of claim 6 wherein the rigid clamp element comprises an arcuate rigid strap in abutting relation with the chuck and with the grinding segment, the chuck provides a notch coplanar with the segment notch and the clamp lug comprises an integral shoulder projecting from the strap into the coplanar notches.

9. The combination of claim 6 wherein the front face comprises notch means extending from both sides thereof toward the center, the rigid element extends between adjacent grinding segments with the lug thereof disposed in the notches of adjacent grinding segments, the releasable securing means being secured to the chuck between adjacent grinding segments.

10. A grinding assembly comprising
 a chuck having circumferentially spaced apart grinding segment receiving means;
 grinding segments in the receiving means comprising sides, a planar bottom grinding face extending axially beyond the chuck, a top face in abutting relation with the chuck precluding axial movement of the segments away from a work piece, and a front face having notch means intermediate the ends thereof; and
 a clamp including
  a lug disposed in the notch means;
  a portion juxtaposed to the chuck; and
  means releasably securing the extending portion to the chuck whereby the grinding segment may be axially advanced to a position wherein the lug engages the segment top face to preclude axial movement of the segments away from a work piece.

11. The grinding assembly of claim 10 wherein the lug is out of engagement with the grinding segment.

12. For use on a grinding machine chuck of the type having circumferentially spaced apart grinding segment receiving means, the combination comprising
 grinding segments for placement in the segment receiving means comprising sides, a planar bottom grinding face, a top face providing an upwardly facing shoulder and a front face having notch means, intermediate the ends thereof; and
 a clamp comprising
  a rigid element for overlying an unnotched portion of the grinding segment and having a lug arranged to be nonengageably disposed in the notch means and having a portion for circumferential extension to juxtapose the chuck; and
  means for releasably securing the circumferentially extending portion to the chuck to position the lug in the notch means or in engagement with the top face shoulder.

References Cited
UNITED STATES PATENTS

| | | | |
|---|---|---|---|
| 2,307,632 | 1/1943 | Meyer | 51—209 |
| 3,171,237 | 3/1965 | Howard | 51—209 |

OTHELL M. SIMPSON, Primary Examiner

U.S. Cl. X.R.

51—109